June 21, 1966  T. BUDZICH  3,256,834
PISTON SHOE ASSEMBLIES
Filed March 16, 1964
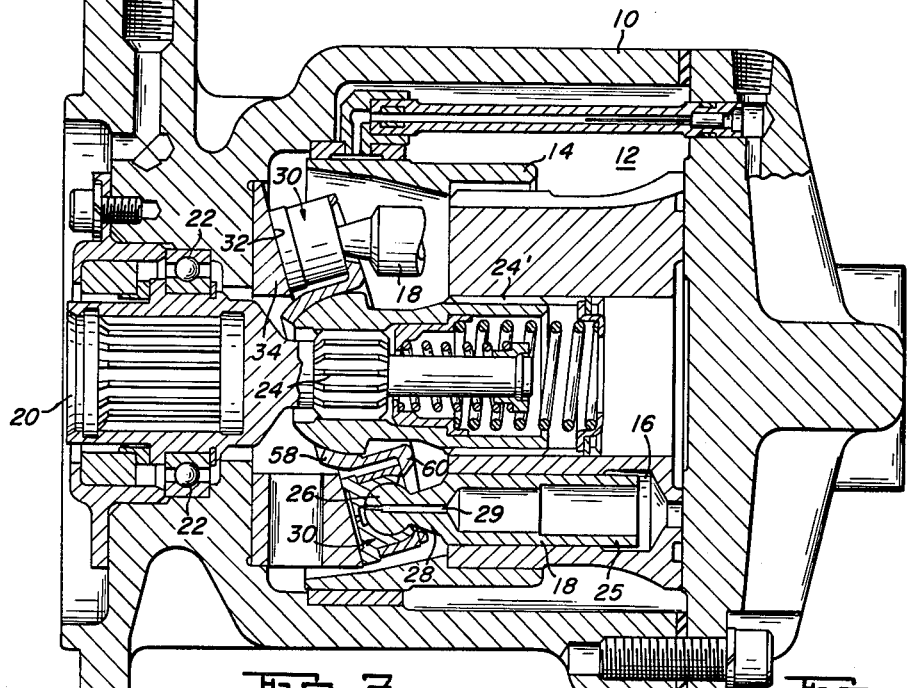
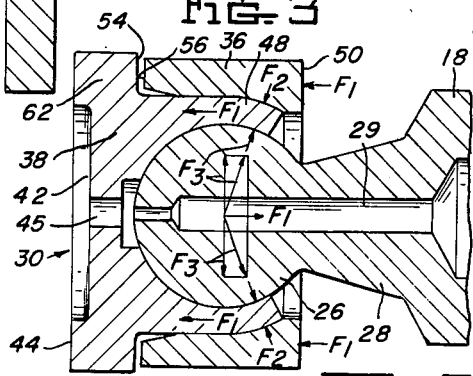
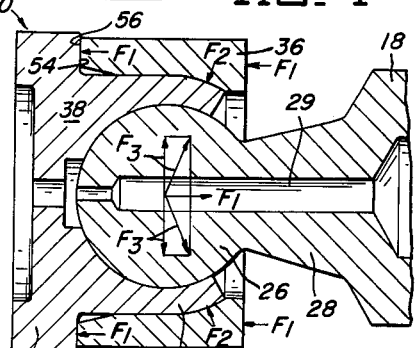
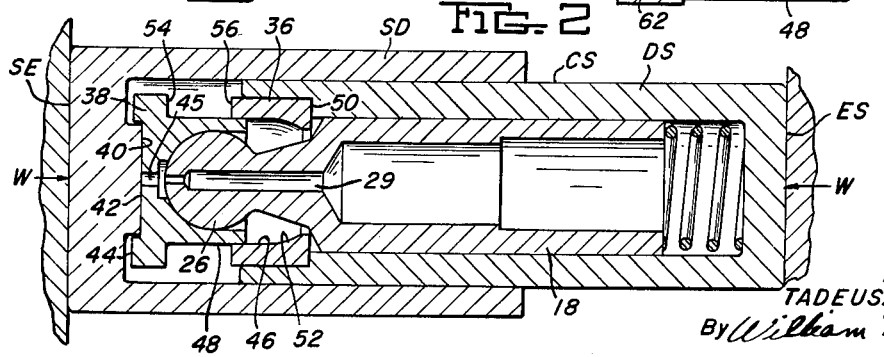
INVENTOR
TADEUSZ BUDZICH
By William N. Hogg
Attorney

United States Patent Office 3,256,834
Patented June 21, 1966

3,256,834
PISTON SHOE ASSEMBLIES
Tadeusz Budzich, 3344 Colwyn Road, Cleveland 20, Ohio
Filed Mar. 16, 1964, Ser. No. 351,953
9 Claims. (Cl. 103—162)

This invention relates generally to fluid pressure energy translating devices which utilize cam plate and nutating plate combinations for generation of reciprocating motion; and more particularly this invention relates to piston shoes assemblies and nutating plates in axial piston pumps and motors.

In most axial piston pumps and motors and particularly in those using an inclined cam plate and nutating plate combination, the pistons are equipped with part spherical ends universally mounting piston shoes. These piston shoes usually have a skirt swaged or closed over the part spherical piston end and a cam plate contacting surface working in operational engagement with the inclined surface of the cam plate. Both the fluid reaction forces and the piston inertia forces must be transmitted through the universal joint between the piston shoe and the part-spherical end of the piston during operation of the device. The nutating plate which constitutes the piston return mechanism, usually engages a reaction surface on the piston shoes parallel to the cam plate contacting surface of the piston shoes and which reaction surface is disposed circumferentially around the universal joint. Especially with the device working as a pump at high speeds, large piston return forces, caused by the piston inertia, and, in some instances, suction pressure differential, must be transmitted from the nutating plate to the piston shoe. Those large piston return forces are in turn transmitted from the piston shoe to the piston through the swaged over piston skirt section subjecting it to tensile and spreading loads. Since the extent of overlap of the piston shoe skirt, i.e., that part extending past the meridian of the spherical piston end is strictly limited by the necessary piston neck which connects the part spherical end with the piston body, the swaged over piston skirt section is subjected to high unit reaction forces, tending to spread it and cause separation between piston shoe and piston. This type of construction of the piston, piston shoe universal joint, well known in the art, becomes especially critical since the selection of the piston shoe material is limited by the necessity of a swaging operation which dictates use of materials comparatively ductile and therefore of low tensile strength characteristics. Such materials, by their very nature, are not suitable to carry large tensile and spreading forces to which the piston shoe skirt is subjected during the piston return cycle.

This type of piston universal joint construction also has an additional serious disadvantage. The surfaces engaging the nutating plate and disposed around the periphery of the piston shoe require larger spacing to accommodate the load carrying section of the nutating plate resulting in an increased piston circle of the device which not only reflects unfavorably in the physical envelope of the device, but, for the same displacement and the same revolutions, results in higher rubbing velocities between piston shoes and the cam plate.

This type of piston universal joint construction has still another disadvantage resulting from the requirement of a very accurate and therefore expensive swaging operation which provides freedom of relative rotation at an absolute minimum working clearance between the swaged parts. A large clearance of the universal joint will permit excessive impact loading on reversal, resulting in failure of the swaged over section of the piston skirt.

It is, therefore, a principal object of this invention to provide an improved universal mounting for piston shoe assemblies on piston ends.

Another object of this invention is to provide an improved construction of the piston and piston shoe universal joint which minimizes the tensile loads on the closed over portion of the piston shoe skirt.

Yet another object of this invention is to provide piston and piston shoe universal joint construction in which the spreading reaction loads are subjecting the swaged over piston skirt to compressive stress which is at least partially carried by an additional high strength member.

A further object of this invention is to provide piston and piston shoe universal joint construction in which the piston return forces are transmitted at least in part to the swaged over section of the piston skirt on its external surface, balancing the spreading forces of the universal joint and therefore minimizing circumferential deflection of the swaged over section of the piston skirt, and thereby providing a substantially fixed clearance universal joint.

Still a further object of this invention is to provide piston and piston shoe universal joint construction in which the critical surface subjected to sliding action of the nutating plate is formed from hard, wear-resistant material while permitting selection of a ductile swageable material for the piston shoe.

An additional more specific object of this invention is to provide piston and piston shoe universal joint construction in which the plane of engagement between the piston shoe and nutating plate is located beyond the meridian of the spherical piston end in the area of the piston neck thus permitting an increased sized web of the nutating plate and reduction in the diameter of the piston circle of the device.

Still a further, more specific object of this invention is to provide an improved piston and piston shoe universal joint construction in which individual dies remained a part of the universal joint construction providing a reaction surface for engagement of the nutating plate.

Still another more general object of this invention is to provide an improved piston and piston shoe universal joint construction which permits an inexpensive yet exact swaging operation without expensive and specialized tooling.

These and other objects and advantages will become apparent from the following description when taken in conjunction with the accompanying drawings in which:

FIGURE 1 is a longitudinal sectional view of a pump or motor incorporating one embodiment of this invention;

FIGURE 2 is a longitudinal sectional view of a piston and piston shoes assembled showing the components in position for swaging of the universal joint by a swinging die to complete the assembly;

FIGURE 3 is a longitudinal sectional view of the piston, piston shoe universal joint assembly with the swaging sleeve supported on the swaged over section and showing the distribution of forces in the universal joint during piston return; and FIGURE 4 is a longitudinal sectional view of the piston and piston shoe universal joint modified from that of FIGURE 3 with the swaging sleeve abutting against the flange of the piston shoe and showing the distribution of forces in the universal joint during piston return.

Referring now to the drawings and particularly to FIGURE 1, an axial piston fluid pump or motor is shown. The device will be described as it operates as a pump but it is to be understood that it is equally adapted to operate as a motor. The pump has a housing 10 defining an internal chamber 12 in which a cylinder barrel 14 is rotatably disposed. The barrel 14 is provided with a plurality of circumferentially spaced cylinder bores 16 in each of which a hollow piston 18 is mounted for axially slidable movement. The cylinder barrel is rotated by shaft 20 which is journalled by bearing 22 and in driving engagement with the barrel 14 through splined connections 24 and 24'.

Each of the pistons has a stem section 25 and a part spherical end 26 connected to the stem section 25 by a necked portion 28. A drilling 29 extends through the part spherical end 26 and neck portion 28 of the piston for hydrostatically balancing, well known in the art.

Each of the part spherical ends 26 of the piston 18 is provided with the piston shoe assembly of this invention designated generally as 30. As the cylinder barrel rotates the piston shoe assemblies 30 act against the surface 32 of an inclined cam plate 34 to provide a pumping action in a well known manner; and the fluid is properly phased by a valve plate (not shown).

FIGURE 2 shows in detail the components of piston shoe assembly in partially assembled relationship; and FIGURE 3 shows the completed assembly of the piston shoe on the part spherical end 26 of the piston 18.

Referring now to FIGURE 2, a die sleeve DS slidably engages piston 18 and retains in sealed engagement at the end thereof a swaging sleeve 36. Outer cylindrical surface CS of the die sleeve DS is guided in swaging die SD the closed end of which supports piston shoe 38 on a flat surface 40 thereof. The surface 40 together with working surface 44 defines a balance cavity 42. The piston shoe 38 has drilling 45 for connecting the drilling 29 with the balance cavity 42 which, in a well known manner, will provide hydrostatic balancing during operation of the pump. The internal diameter of the swaging sleeve 36 is large enough to pass freely over the diameter of the part spherical end 26 of piston 18. The internal cylindrical surface 46 of swaging sleeve 36 is slideably guided on the external surface of a skirt portion 48 of the piston shoe 38. The piston shoe skirt 48 is generally of tubular configuration and of sufficient length to extend beyond the meridian of the part spherical end 26. Sufficient length of the piston neck portion 28 is provided to permit location of the swaging sleeve 36 in the position as shown. The die sleeve DS is provided with an end surface ES and the die SD is provided with die end surface SE which surfaces are placed in contact with working surfaces of a conventional press wherein a force W is applied tending to telescope together die sleeve DS and swaging die SD. The swaging sleeve 36 is formed of a rather hard, strong material and the piston shoe skirt is formed of a softer more ductile material, and since reaction surface 50 of the swaging sleeve 36 extends beyond the periphery of the piston 18, once the force W is applied the swaging sleeve 36, guided by the piston shoe skirt 48, will slide. The sliding of swaging sleeve 36 will deform a portion of the piston shoe skirt 48 because of the part-spherical configuration of the upper part of inner wall 52 of the swaging sleeve 36 and the deformation of the skirt 48 will form an internal part spherical surface on the skirt 48 surrounding the part spherical end 26 of the piston 18 extending past the meridian of the part spherical end 26. The swaging is ceased while there is still space between annular surface 54 on the piston sleeve 38 and the end surface 56 of the swaging sleeve 36. This completes the formation of the piston shoe assembly and when this swaging operation is completed the die sleeve DS and die SD are disengaged from the piston, and piston shoe assembly, leaving the piston shoe assembly completely assembled as shown in FIGURE 3. When the piston and the piston shoe assembly are incorporated in the pump as shown in FIGURE 1, the piston shoes 38 are maintained against the cam surface 32 on the suction strokes by a nutating plate 58, having an annular reaction face 60 in sliding engagement with the reaction surfaces 50 of the swaging sleeves 36.

Referring now to FIGURE 3, the reaction forces on an assembled piston sleeve assembly are shown. During piston return, forces $F_1$ are exerted on the reaction surface 50 of the swaging sleeve 36 (which is parallel to working surface 44 of the piston shoe 38) by the reaction face 60 of the nutating plate 58 (shown in FIGURE 1). This results in a bearing pressure (shown by hash marks), on the reaction surface 50 which surface is subjected to sliding motion during reciprocation of the pistons 18. The forces $F_1$, because of the mechanical advantage of the spherically inclined surface, generate bearing pressure between swaging sleeve 36 and the part spherical section of the piston shoe skirt 48 and are represented by resulting forces $F_2$. Since the forces $F_1$, applied to piston shoe assembly, will induce equal and opposite reaction forces in the piston 18, those forces can only be transmitted through bearing pressure between the part spherical end 26 and piston shoe skirt 48 which is represented by resultant forces $F_3$. Because of the geometrical configuration of the universal joint both forces $F_2$ and $F_3$ must pass through the center of the spherical surface of the part spherical end 26 and are shown vectorially by vector arrows $F_3$ to demonstrate the equilibrium condition of the universal joint. It is evident from the force and bearing pressure distribution that the part spherical portion of the piston skirt 48 is in a state of equilibrium, under the action of the spreading forces $F_3$, the balancing force being supplied from the swaging sleeve 36. Therefore, when using this principle the ductile material of the piston skirt 48 will not tend to deform, thus providing a universal joint which will work irrespective of the magnitude of piston return forces at a fixed initial clearance of assembly. Furthermore, the ductile material of the piston skirt 48 causes virtually no tensile loads associated with a conventional piston, piston shoe universal joint constructions.

A slightly modified embodiment of the piston and piston shoe assembly is shown in FIGURE 4. In this embodiment the swaging sleeve 36 is slightly longer than in the embodiment of FIGURES 1 through 3 so that after swaging the end surface 56 of the swaging sleeve 36 is in contact with the annular surface 54 of the piston shoe 38. Therefore, there is a somewhat different force distribution in the universal joint which distribution is shown in FIGURE 4. Here the piston return forces $F_2$ are directly transmitted in compression by the swaging sleeve 36 to web section 62 of the piston shoe 30. The equal and opposite reaction forces of piston 18 are transmitted in the form of bearing pressure to the piston shoe skirt 48 and are represented as resultant forces $F_3$. The spreading action of resultant forces $F_3$ is partially opposed and transmitted through the ductile material of the piston shoe skirt 48 to the high strength swaging sleeve 36 which has a part spherical surface mating with the piston shoe skirt 48. Since the swaging sleeve is made from high strength hard material with low ductility the combination forms a universal joint which will work at a fixed installation clearance.

In addition to providing long life, low cost and durability, the piston and piston shoe assemblies of this invention permit use of hard, wear resistant material in the piston shoe assembly for those portions working in contact with the nutating plate instead of soft piston shoe material, which is the case in conventional designs. The piston shoe assembly of FIGURE 3 is somewhat less costly than that of FIGURE 4 since the gap between surfaces 54 and 56 permits a swaging action at a specified compressive force level W, developed by the hydraulic press (see FIGURE 2). This lower cost therefore makes the embodiment of FIGURE 3 preferable in many instances. In the assembly of FIGURE 3, variation in the manufacturing tolerances of the component parts will result in variation in width of the space separating surfaces 54 and 56 still providing a satisfactory universal joint. Additional advantage of this type of piston, piston shoe universal joint construction, which is even less readily apparent, lies in the fact that it permits much stiffer nutating plate construction, while allowing reduction in the piston circle diameter. The diameter of the web section 62, is determined by the required area of the balanced cavity 42 subjected to the discharge pressure and the sealing area of the piston shoe working surface, subjected to pressure gradient to completely balance hydraulic forces, developed on pumping end of the piston. In conventional designs this diameter of the piston shoe web 62 must be further increased to provide sufficient engagement surface for the nutating plate. This results in large piston shoe web diameters which in turn will result in increased piston circle and therefore increased rubbing velocity between piston shoes 38 and cam surfaces 32. In this invention the diameter of the piston shoe web 62 is only determined by areas required to balance the pumping forces, large contact areas and nutating plate clearance being provided in the zone of the reduced diameter of the piston neck 28. This in turn permits use of lower bearing pressures between the nutating plate and piston shoes and stiffening of the nutating plate construction which, usually in piston pumps because of the space limitations, becomes a critical item.

While I have illustrated and described several embodiments, various modifications may obviously be made without departing from the true spirit and scope of the invention which is intended to be defined only by the accompanying claims taken with all reasonable equivalents.

I claim:

1. In a piston and piston shoe assembly wherein the piston includes a stem portion and a part spherical end portion connected to said stem portion, the improvement which comprises, a piston shoe assembly mounted on said part spherical end portion, said piston shoe assembly including a piston shoe having a skirt portion closed over said part spherical end mounting said piston shoe for universal movement on said part spherical end, said skirt portion extending beyond the meridian of the part spherical end, said piston shoe including a web portion having a face disposed to operate against a cam surface, and sleeve means engaging at least the portion of the skirt which extends past the meridian, said sleeve means having a reaction surface disposed to engage a nutating plate, said sleeve means being configured to transmit forces generated on said reaction surface from said nutating plate to said portion of the skirt engaged by the sleeve means in a direction generally toward closing said sleeve over said part spherical end.

2. The combination of claim 1 wherein said web portion of the piston shoe has an annular face and said sleeve has an end surface abutting said annular face whereby a portion of the forces from said nutating plate are carried by the web portion of the sleeve.

3. The combination of claim 1 wherein said web of the piston shoe is spaced from the end of the sleeve means, whereby the reaction forces from the nutating plate are carried by said skirt portion.

4. In a fluid pressure energy translating device having a cylinder barrel with plurality of cylinder bores, piston means arranged for reciprocation in said cylinder bores, nutating plate and cam plate means arranged to reciprocate said piston means on their inlet and discharge strokes, the improvement in said piston means which comprises a piston having a stem portion and a part spherical end portion connected to said stem portion by a neck portion, a piston shoe assembly mounted for universal movement on said part spherical end portion, said piston shoe assembly including piston shoe having a working surface in sliding engagement with said cam plate means and a skirt section closed over said part spherical end with an internal part spherical surface formed which extends past the meridian of said part spherical end, sleeve means engaging said skirt portion and having a reaction surface disposed to engage said nutating plate, said sleeve means being configured to transmit the force on the reaction surface from said nutating plate in a direction tending to compress said skirt on said part spherical portion of the piston, whereby said piston shoe and sleeve means combination can swivel freely on said spherical end portion while transmitting force to and from said piston.

5. In a fluid pressure energy translating device having a cylinder barrel with a plurality of cylinder bores, piston means arranged for reciprocation in said cylinder bores, nutating plate and cam plate means arranged to reciprocate said piston means on their inlet and discharge strokes, the improvement in said piston means which comprises a piston having a stem portion and a part spherical end portion connected to said stem portion by a neck portion, a piston shoe assembly combination arranged to swivel on said part spherical end portion, said piston shoe assembly including a piston shoe having a working surface in sliding engagement with said cam plate means and a skirt section closed over said part spherical end with an internal part spherical surface formed past the meridian of said part spherical end, a swaging sleeve having a curved internal surface engaging said skirt section of the piston shoe, said swaging sleeve having a reaction surface parallel to said working surface disposed to engage said nutating plate, said swaging sleeve being configured to transmit the force on the reaction surface from said nutating plate in a direction tending to compress said skirt on said part spherical portion of the piston, whereby said piston shoe and swaging sleeve combination can swivel freely on said spherical piston head while transmitting force to and from said piston.

6. The combination of claim 5 further characterized by said curved internal surface of said swaging sleeve being part spherical in configuration.

7. In a fluid pressure energy translating device having a cylinder barrel with plurality of cylinder bores, piston means arranged for reciprocation in said cylinder bores, nutating plate and cam plate means arranged to reciprocate said piston means on their inlet and discharge strokes, the improvement in said piston means which comprises, a piston having a stem portion and a part spherical end portion connected in said stem portion by a neck portion, said piston shoe assembly including a piston shoe and a swaging sleeve combination arranged to swivel on said part spherical end portion, said piston shoe having a flat working surface in sliding engagement with said cam means and a skirt portion having an internal part spherical surface closed over the part spherical end and extended past the meridian of the part spherical end by closing action of said swaging sleeve, each swaging sleeve having a flat annular reaction surface substantially parallel to said flat working surface of the piston shoe, the inside diameter of the sleeve being larger than spherical diameter of the part spherical piston end, said flat annular reaction surface abutting said nutating plate, whereby said piston shoe and swaging sleeve combination can swivel freely on said spherical piston head while transmitting force from and to said piston.

8. In a fluid pressure energy translating device having a cylinder barrel with plurality of cylinder bores, piston means arranged for reciprocation in said cylinder bores, nutating plate and cam plate means arranged to reciprocate said piston means on their inlet and discharge strokes the improvement in said piston means which comprises, a piston having a stem portion and a part spherical end portion connected to said stem portion by a neck portion, said piston shoe assembly including a piston shoe and a swaging sleeve combination arranged to swivel on said spherical piston end portion, said piston shoe having a flat working surface in sliding engagement with said cam means and a skirt portion having an internal spherical surface closed over said part spherical end and extended past the meridian of the part spherical end by closing action of said swaging sleeve, said swaging sleeve having a flat annular reaction surface substantially parallel to said working surface of the piston shoe, the inside diameter of said sleeve being larger than the spherical diameter of the part spherical piston end, said flat annular reaction surface abutting said nutating plate, whereby said piston shoe and swaging sleeve combination can swivel freely on said spherical head while transmitting force from and to said piston.

9. The combination of claim 8 further characterized by said flat annular reaction surface of said swaging sleeve being circumferentially spaced about the neck portion of the piston.

References Cited by the Examiner

UNITED STATES PATENTS

| | | | |
|---|---|---|---|
| 2,638,850 | 5/1953 | Ferris | 103—162 |
| 2,880,042 | 3/1959 | Budzich | 103—162 |

SAMUEL LEVINE, *Primary Examiner.*

R. M. VARGO, *Assistant Examiner.*